United States Patent
Lemasson et al.

(10) Patent No.: US 7,902,987 B2
(45) Date of Patent: Mar. 8, 2011

(54) DRIVER ALERT SYSTEM FOR THE STEERING WHEEL OF A MOTOR VEHICLE

(75) Inventors: Pascal Lemasson, St. Georges les Baillargeaux (FR); Julien Courty, Toulouse (FR); Philippe Vincent, Nesles la Vallée (FR)

(73) Assignee: Autoliv Development AB, Vargarda (SE)

( * ) Notice: Subject to any disclaimer, the term of this patent is extended or adjusted under 35 U.S.C. 154(b) by 349 days.

(21) Appl. No.: 12/137,973

(22) Filed: Jun. 12, 2008

(65) Prior Publication Data
US 2009/0096595 A1    Apr. 16, 2009

(30) Foreign Application Priority Data
Oct. 10, 2007    (DE) .......................... 20 2007 014209

(51) Int. Cl.
*G08B 23/00* (2006.01)
(52) U.S. Cl. ........................ 340/576; 340/438; 340/407.1
(58) Field of Classification Search ............... 340/425.5, 340/435, 438, 439, 407.1, 575, 576; 180/169, 180/272, 446; 701/41; 345/173
See application file for complete search history.

(56) References Cited

U.S. PATENT DOCUMENTS

| | | | |
|---|---|---|---|
| 5,667,033 A * | 9/1997 | Shimizu et al. | 180/272 |
| 6,992,571 B2 * | 1/2006 | Ota et al. | 340/407.1 |
| 7,079,929 B2 * | 7/2006 | Sawada et al. | 701/41 |
| 7,259,660 B2 | 8/2007 | Ewerhart et al. | |
| 7,280,046 B2 | 10/2007 | Berg et al. | |
| 2003/0197601 A1 | 10/2003 | Takagi et al. | |
| 2008/0246737 A1 * | 10/2008 | Benali-Khoudja et al. | 345/173 |
| 2009/0066521 A1 * | 3/2009 | Atlas et al. | 340/575 |

FOREIGN PATENT DOCUMENTS

| | | |
|---|---|---|
| DE | 1513128 A | 8/1969 |
| DE | 19749587 C1 | 6/1999 |
| DE | 69633037 T2 | 12/2004 |
| EP | 0856432 A2 | 8/1998 |
| WO | WO 2007/060175 A1 | 5/2007 |

* cited by examiner

*Primary Examiner* — Van T. Trieu
(74) *Attorney, Agent, or Firm* — Brinks Hofer Gilson & Lione

(57) ABSTRACT

A driver alert system for the steering wheel of a motor vehicle. The system comprises an electric motor, an eccentric mass connected to the electric motor, and a control circuit for providing electric supply to the electric motor in response to an alert activation signal The motor is controlled by the control circuit to an operation level of voltage during a portion of a vibration period with a non-vibration period following the vibration period, and the motor is over or under-controlled with respect to the operation range at the beginning or end of said vibration period.

31 Claims, 3 Drawing Sheets

DRIVER ALERT SYSTEM FOR THE STEERING WHEEL OF A MOTOR VEHICLE

CROSS REFERENCE TO RELATED APPLICATION

This application claims priority to DE 20 2007 014209.0, filed Oct. 10, 2007.

FIELD OF THE INVENTION

The invention relates to a driver alert system for the steering wheel of a motor vehicle,

BACKGROUND OF THE INVENTION

A driver alert system is known, for example, as described by BP 0 856 432 A2 and US 2003 0197601 A1.

When the driver alert system of the prior art is activated by supplying a voltage to the electric motor in order to cause vibrations in the steering wheel rim, the rotation frequency of the motor may accelerate only slowly and under negative circumstances may even be trapped at a resonance frequency of the steering wheel column. This could be overcome by using a stronger electric motor which however would require more space and leads to an increase of costs. Similarly, when the electric motor is stopped at the end of a vibration period, the motor may decelerate only slowly.

It is the object of the invention to provide a compact and reliable driver alert system with short response times.

SUMMARY OF THE INVENTION

According to one aspect of the invention, the motor is over-controlled with respect to the operation level at the beginning of a vibration period. Because of the higher initial value, the motor accelerates more quickly and passes through possible resonances of the steering wheel column without getting trapped or being significantly delayed. Furthermore, the abrupt starting of the motor improves the alerting effect When the motor has reached the desired operation frequency, the electrical power can be reduced to a normal operation value. The size of the motor can be chosen based on normal operation conditions, an extraordinarily strong and large motor is not required.

The following description is based on an over-controlled voltage but is also valid for an over-controlled current. Over-controlled voltage means that the voltage has the same sign as the operation voltage level but a larger absolute magnitude, i.e. in case of a negative operation voltage level, the over-controlled voltage is even more negative. In case the operation voltage level is not essentially constant, the term operation voltage level refers to an average value of the operation voltage.

The effect of the invention can be increased by preferably setting the over-controlled voltage to be at least 20%, more preferably at least 50% with respect to the normal operation voltage level.

According to another aspect of the invention which is independent of the aspect mentioned before, the motor is under-controlled with respect to zero level at the end of the vibration period. The following description is based on an under-controlled current but is also valid for an under-controlled voltage. At the end of the vibration period, current control is performed to generate a reverse current with respect to the operation current level during vibration. The under-control generates a torque counteracting the rotation of the motor, and therefore decelerates the motor more quickly in comparison to switching the motor off only. The more or less abrupt halting of the motor contributes to improving the alerting effect.

As an alternative to actively controlling the motor at the end of the vibration period, a current maintaining path for the motor and circuitry for opening the current maintaining path at the end of the vibration period may be opened. If the motor is switched off at the end of the vibration period, the opening of the current maintaining path allows the motor to function as a generator, whereby the electric energy stored in the electric motor can be passed off quickly through the current maintaining path, which quickly slows down the motor by reducing its rotational energy.

Preferably the vibration periods are separated by non-vibration periods in order to distinguish the alert vibrations clearly from other vibrations. This is preferably achieved by periodically interrupting the supply of operation voltage, in particular by periodically applying zero voltage to said electric motor,

BRIEF DESCRIPTION OF THE DRAWINGS

The invention shall be explained in the following on the basis of preferred embodiments of the invention and with reference to the accompanying drawings, which show.

DETAILED DESCRIPTION OF THE INVENTION

Figure 1:
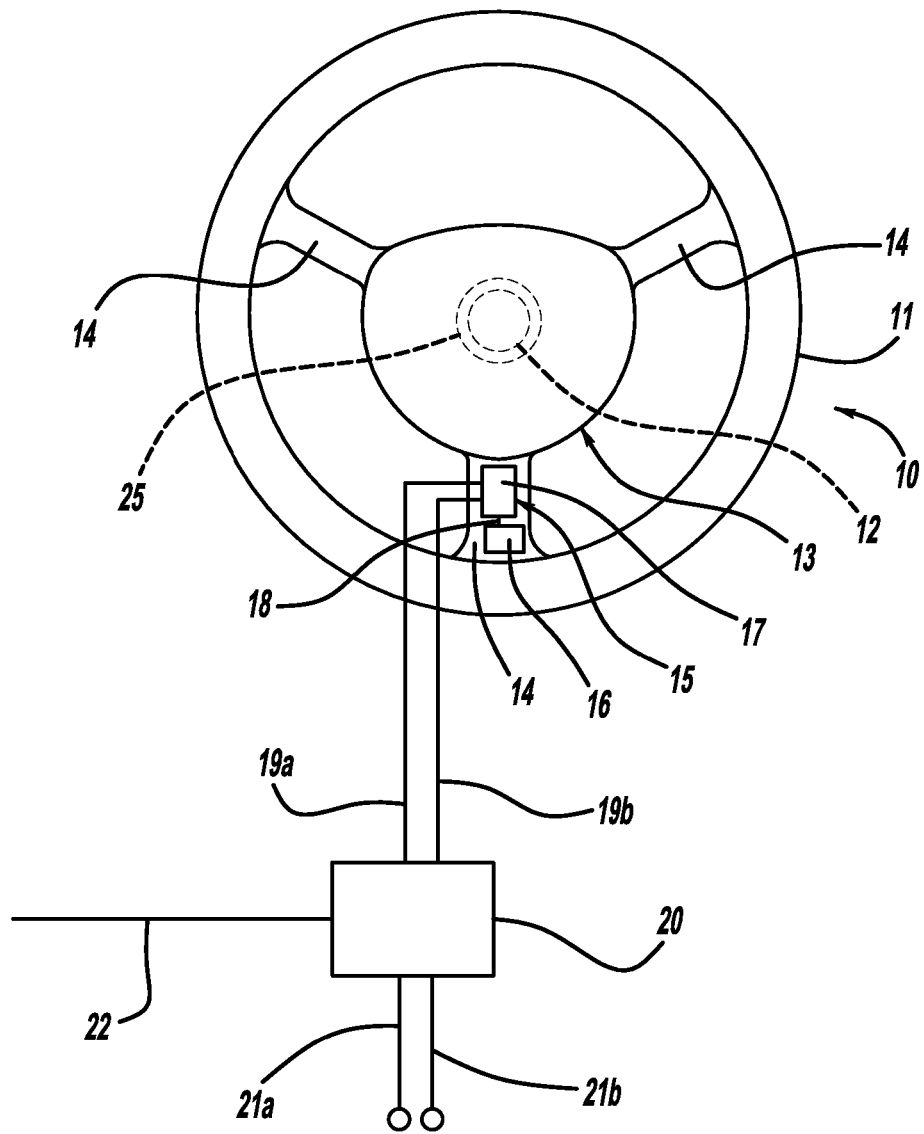
FIG. 1 is a schematic view of a steering wheel arrangement with a driver alert system in accordance with this invention.

The steering wheel arrangement according to FIG. 1 is part of a motor vehicle and comprises a steering wheel 10 with a rim 11 which is connected to a steering wheel column 12 by means of a frame part 13 comprising spokes 14 and hub 25. A vibration unit 15 is connected to the frame part 13, in particular to one of the spokes 14. The vibration unit 15 comprises an electric DC motor 17 and a mass 16 eccentrically connected to the rotation axis 18 of the motor 17.

The electric motor 17 is connected via supply lines 19a and 19b to an electric control circuit 20 which is connected via supply lines 21a and 21b to an on-board power supply. Furthermore, the control circuit 20 is connected to receive data signals in particular via an on-board data bus 22.

Figure 2:
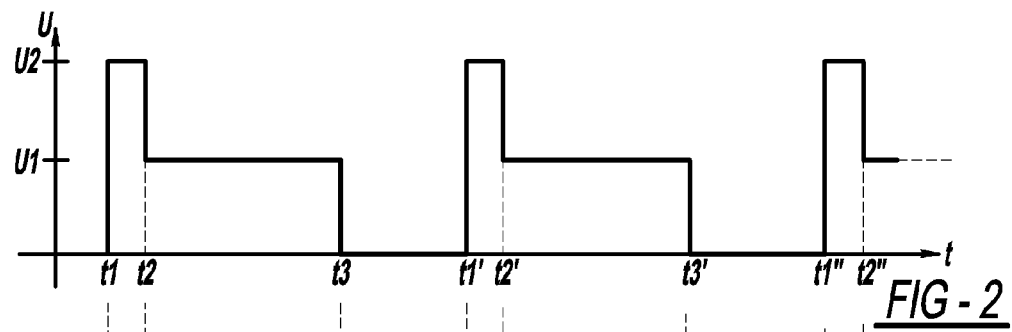
FIG. 2 is a control voltage diagram according to one embodiment of the invention.
Figure 3:
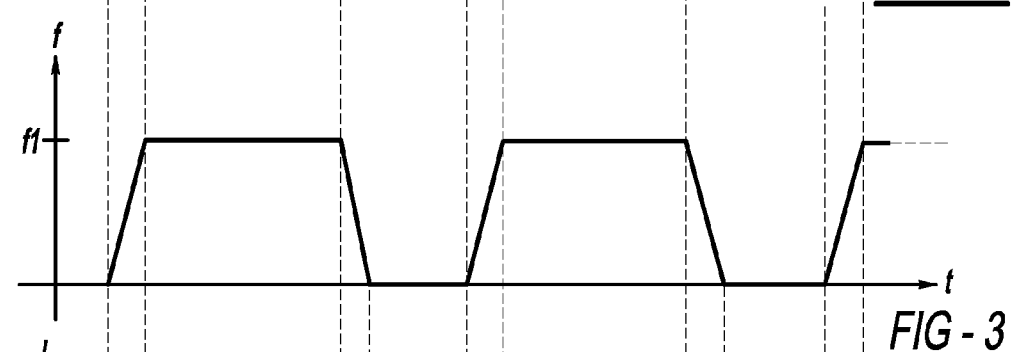
FIG. 3 is a rotational frequency diagram of the motor.
Figure 4:
FIG. 4 is a control voltage diagram according to another embodiment of the invention.
Figure 5:
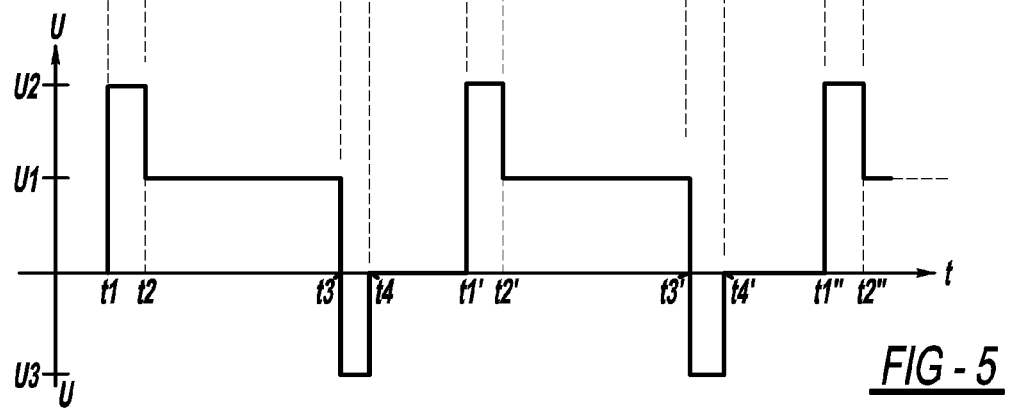
FIG. 5 is a control voltage diagram according to a further embodiment of the invention.
Figure 6:
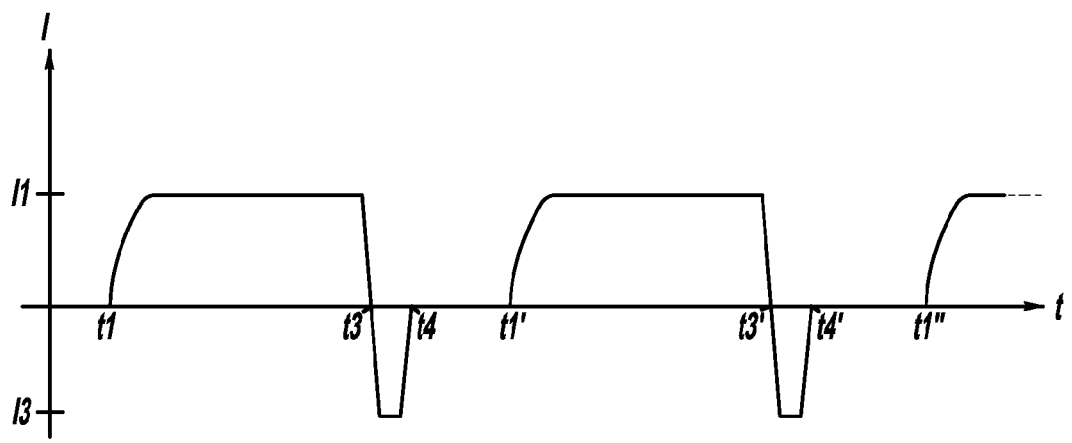
FIG. 6 is a drawing of an embodiment of the control circuit with an electric brake circuit.

FIGS. 2 and 5 show voltage waveforms which the control circuit 20 applies to the electric motor 17 via the supply lines 19a and 19b in different voltage control embodiments. FIGS. 4 and 6 show the current flowing through the motor 17 over time in different embodiments where current control is performed at the end of the vibration periods. FIG. 3 shows a corresponding diagram of the rotation frequency (speed) of motor 17 over time.

It is assumed that the control circuit 20 receives an alert activation signal via the data bus 22 at time t1 or shortly before. In response to the alert activation signal, the control circuit 20 supplies electric energy from the supply lines 21a and 21b to the motor 17 via the supply lines 19a and 19b in order to generate vibrations in the rim 11 of the steering wheel 10 for alerting the driver.

In general, the waveform of the control signal is periodic, where periods of vibration are interrupted by periods of non-vibration which increases the alerting effect. More particularly, a predetermined, essentially constant operation level voltage U1 is periodically applied for a predetermined operation time period (from t2 to t3, t2' to t3+, . . . ). As shown in FIG. 3, once the rotation speed of the eccentric mass 16 has reached the desired operation frequency f1, applying the operation level voltage U1 maintains constant rotation of the eccentric mass 16 at this operation frequency f1; in this operation state, an essentially constant operation current 11 is flowing through the motor 17 as shown in FIGS. 4 and 6. Essentially constant operation voltage level U1 in particular means constant within ±10%. The vibration periods preferably have all the same length which is preferably in the range of 250 ms to 5 s.

The vibration periods are periodically interrupted by applying zero voltage for a predetermined non-vibration time period (for example, from t3 to t1' and t3' to t1" in FIGS. 2 and 5, and from t4 to t1' and t4' to t1" in FIG. 6). The non-vibration periods preferably have all the same length which is preferably in the range of 250 ms to 1 s.

The operation level voltage U1 may for example be 6V, i.e. half of the usual on-board voltage of 12V for a typical motor vehicle. In general, the driver alert system may comprise suitable means for transforming the usual on-board voltage to the operation voltage level U1 or any other voltage level used to control the motor 17.

In view of an effective alerting action, a preferred operation frequency f1 of the eccentric mass in the vibration period may be in the range of 30 to 70 Hz, more preferably 40 to 60 Hz, in particular approximately 50 Hz.

In the embodiment of FIG. 2, at the beginning of preferable at the end of each vibration period, i.e. at times t1, t1', t1", . . . , the control circuit 20 applies to the motor 17 an over-controlled voltage level U2 which has the same sign (polarity) as the operation voltage level U1 but a larger absolute magnitude. Due to the higher torque exerted on the eccentric mass 16, the rotation frequency f shown in FIG. 3 reaches the operation frequency f1 at time t2 much quicker than in a case where the operation voltage level U1 would be applied from the beginning (time t1). Possible resonance frequencies of the steering column 12 are passed without significant delay or even trapping of the rotation at a resonance frequency.

The length of the time period from t1 to t2, t1' to t2', . . . , in which the over-controlled voltage level U2 is applied can be predetermined according to the known parameters of the motor 17 and the eccentric mass 16. Alternatively, if the rotation speed of the motor 17 can be determined during operation, the voltage applied to the motor 17 can be switched from the over-controlled voltage level U2 to the operation voltage level U1 when the rotation speed of the motor 17 has been determined to have reached a predetermined value.

The value of the over-controlled voltage level U2 may be preferably twice the value of the operation voltage level U1 for example 12 V.

At the end of each vibration period, the motor 17 should be halted as quick as possible in order to improve the alerting effect in the preferred embodiments of FIGS. 4 and 6, this is achieved by current-controlling the motor 17 at the end of the vibration periods. For this purpose, the control circuit 20 preferably comprises a suitable current control circuit. As shown in FIGS. 4 and 6, a reversed current I3 is generated in the motor 17, preferably at the end of each vibration period. More particularly, at the beginning of each non-vibration period, i.e. at times t3, t3', t3", . . . , the control circuit 20 applies to the motor 17 an under-controlled current level I3 which has the opposite sign (polarity) as the operation current level I1. The reversed current level I3 causes a torque acting on the eccentric mass 16 in a direction opposite to the rotation direction, which decelerates the motor 17 much quicker than in a case where zero current is applied instead. Possible resonance frequencies of the steering column 12 are passed without significant delay or even trapping of the rotation at a resonance frequency.

The length of the time period from t3 to t4, t3' to t4', . . . , in which the under-controlled current level I3 is generated can be predetermined according to the known parameters of the motor 17 and the eccentric mass 16. Alternatively, if the rotation speed of the motor 17 can be determined during operation, the current applied to the motor 17 can be controlled from the under-controlled current level I3 to zero current when the motor 17 has been determined to have essentially reached still stand.

The absolute magnitude of the under-controlled current level I3 may preferably be equal to the absolute magnitude of the operation current level I1.

FIG. 4 shows a spike in the current at the beginning of the vibration period which is caused by the over-controlled voltage level U2 as shown in FIG. 2. As an alternative, it is possible to over-control the current to a level I2 higher than the operation current level I1 at the beginning of the vibration period, which has similar effects as over-controlling the voltage.

The embodiment shown in FIG. 6 demonstrates, for example in comparison to FIG. 4, that the aspect of the invention concerning the quick halting of the motor 17 at the end of the vibration periods is independent of the aspect of the invention concerning the quick acceleration of the motor 17 at the beginning of the vibration periods.

As an alternative to the generation of a reversed current, a voltage level U3 reversed with respect to the operation voltage level U1 may be applied to motor 17 at the end of preferably each vibration period, as shown in the embodiment of FIG. 5. This has a similar effect compared to the generation of a reversed current. Regarding the length of the time period from t3 to t4, t3' to t4', . . . , in which the under-controlled voltage level U3 is applied, the same as described in connection with current control is valid provided through appropriate circuit arrangements. The absolute magnitude of the under-controlled voltage level U3 may preferably be equal to the absolute magnitude of the operation voltage level U1.

In the embodiments of FIGS. 4 to 6, the control circuit 20 is arranged to perform active voltage and/or current control of the motor 17 at the end of the vibration periods. As an alternative, as shown schematically in FIG. 7, a current maintaining path 23 for the motor 17 may be provided in the control circuit 20 in addition to (in particular parallel to) the normal current path between the supply lines 21a, 21b and the supply lines 19a, 19b.

The current maintaining path 23 is opened at the end of the vibration periods by means of corresponding circuitry 24. This allows the motor 17 to function as a generator maintaining a current flow through the current maintaining path 23. The current maintaining path 23 may be dissipative, i.e. electric work done in dissipative elements in the current maintaining path 23 generates heat which quickly reduces the rotation energy of the motor 17, causing an essentially abrupt halting of the motor 17. Alternatively, the current maintaining path 23 may be regenerative, i.e. means may be provided for feeding back the energy generated by the motor 17 when acting as a generator into the on-board energy supply. The control circuit 20 may also comprise electrical storage means for storing the electrical energy generated by the motor 17 when acting as a generator.

The circuitry 24 may comprise a diode connected to the motor 17 which allows a current to flow after switching off the motor 17 at the end of the vibration period. The circuitry 24 may comprise a dissipative element, in particular a resistor, connected in the current maintaining path 23 allowing the transformation of rotational energy stored in the motor 17 into heat in the resistor which quickly decelerates the motor 17. More general, the circuitry 24 may comprise an energy absorbing element.

Alternatively, the circuitry 24 may comprise a voltage limiting element, for example a Zener diode or a varistor, connected parallel to the switching means in the control circuit 20 for closing the connection between the supply lines 21*a* and 21*b* and the supply lines 19*a* and 19*b*. A voltage limiting element allows to make use of the reversed voltage induced by switching off the control voltage at the end of the vibration period for braking the motor 17 without damaging the switching means in the control circuit 20 for closing the connection between the supply lines 21*a* and 21*b* and the supply lines 19*a* and 19*b*.

While low-cost passive elements are preferred for the circuitry 24, active control elements for closing and opening the current maintaining path 23 are also possible.

Figure 7:
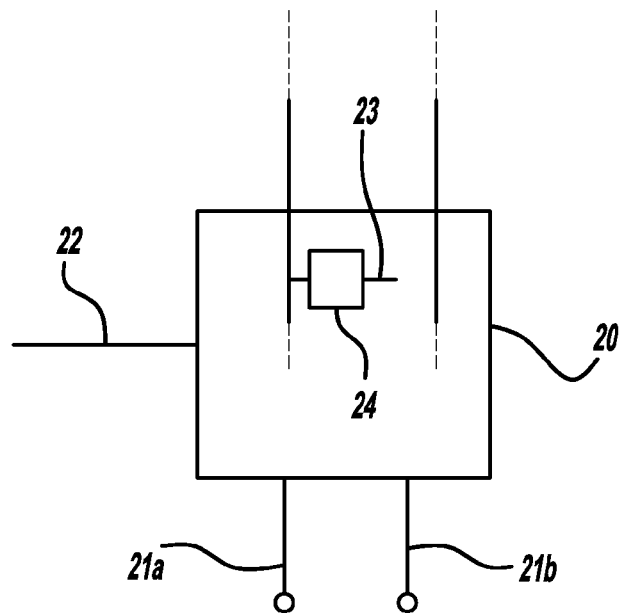
FIG. 7 is a drawing of another embodiment of the control circuit with an electric brake circuit.

The embodiment shown in FIG. 7 may for example be combined with a voltage control waveform as shown in FIG. 2, but also with a simple square waveform of the control voltage.

Although only one vibration unit 15 is shown in FIG. 1, the steering wheel 10 may comprise a plurality of vibration units 15, for example one vibration unit 15 for each spoke 14 of the steering wheel 10.

While the above description constitutes the preferred embodiment of the present invention, if will be appreciated that the invention is susceptible to modification, variation and change without departing from the proper scope and fair meaning of the accompanying claims.

The invention claimed is:

1. A driver alert system for a steering wheel of a motor vehicle, comprising an electric motor, an eccentric mass connected to the electric motor and coupled with the steering wheel, a control circuit for providing electric supply to the electric motor in response to an alert activation signal, wherein the motor is controlled by the control circuit to an operation level of voltage during a portion of a vibration period with a non-vibration period following the vibration period, and the motor is over or under-controlled with respect to the operation level at the beginning or end of the vibration period.

2. A driver alert system according to claim 1, wherein the motor is at least 20% over-controlled with respect to the operation level.

3. A driver alert system according to claim 2, wherein the motor is at least 50% over-controlled with respect to the operation level.

4. A driver alert system according to claim 1, wherein the motor is under-controlled to a reverse current level at the end of the vibration period.

5. A driver alert system according to claim 4, wherein the absolute magnitude of the reverse current level is controlled to be approximately the same as the current level during the vibration period.

6. A driver alert system according to claim 1, wherein the operation level of voltage is essentially constant.

7. A driver alert system according to claim 1, wherein the control circuit is adapted to periodically interrupt the electric supply to the motor in order to create alternating of the vibration periods and the non-vibration periods.

8. A driver alert system according to claim 7, wherein all the vibration periods have approximately the same length of time.

9. A driver alert system according to claim 7, wherein all the non-vibration periods have approximately the same length of time.

10. A driver alert system according to any claim 1, wherein there is a plurality of the vibration periods and the vibration periods each have a length of time in the range of 250 ms to 5 s.

11. A driver alert system according to claim 1, wherein there is a plurality of the non-vibration periods and the non-vibration periods have a length of time in the range of 250 ms to 1 s.

12. A driver alert system according to claim 1, wherein the control circuit comprises a current maintaining path for the motor and circuitry for opening the current maintaining path at the end of the vibration period.

13. A driver alert system according to claim 1, wherein the electric motor is a DC motor.

14. A driver alert system according to claim 1 wherein the operation voltage level is chosen to maintain a rotation frequency of the motor in the range of 30 to 70 Hz within the vibration period.

15. A driver alert system according to claim 1, wherein the electric motor is connected to a spoke of the steering wheel.

16. A driver alert system for a steering wheel of a motor vehicle, comprising an electric motor, an eccentric mass connected to an axis of the electric motor and coupled with the steering wheel, and a control circuit for providing electric supply to the electric meter in response to an alert activation signal, wherein the motor is controlled to provide one or more vibration periods in which the motor rotates the mass to produce vibrations, and one or more non-vibration periods in which the mass is not rotated with the one or more vibration periods alternating with the one or more non-vibration periods, and the motor is controlled during a vibration period after an initial segment of the vibration period at an operation voltage level, and the motor is over-controlled with respect to the operation level during the initial segment.

17. A driver alert system according to claim 16, wherein the motor is at least 20% over-controlled during the initial period with respect to the operation level.

18. A driver alert system according to claim 16, wherein the motor is at least 50% over-controlled during the initial period with respect to the operation level.

19. Driver alert system according to claim 16, wherein the motor is under-controlled with respect to the operation level to a reverse current level at an end segment of one or more of the vibration periods.

20. A driver alert system according to claim 16, wherein the operation level is essentially constant.

21. A driver alert system according to claim 16, wherein the control circuit is adapted to periodically interrupt the electric supply to the motor in order to create the non-vibration periods.

22. A driver alert system according to claim 21, wherein the vibration periods each have a length in the range of 250 ms to 5 s.

23. A driver alert system according to claim 21, wherein the non-vibration periods each have a length in the range of 250 ms to 1 s.

24. A driver alert system according to claim 16, wherein the operation voltage level is chosen to maintain a rotation frequency of the motor in the range of 30 to 70 Hz within the vibration period.

25. A driver alert system for a steering wheel of a motor vehicle, comprising an electric motor, an eccentric mass connected to an axis of the electric motor and coupled with the steering wheel, and a control circuit for providing electric supply to the electric motor in response to an alert activation signal, wherein the motor is controlled to provide one or more vibration periods in which the motor rotates the mass to produce vibrations and one or more non-vibration periods following a vibration period in which the mass is not rotated, and the motor is controlled during the vibration period before an end segment of the vibration period at an operation level, arid the motor is under-controlled with respect to the operation level during the end segment.

26. A driver alert, system according to claim 25, wherein the motor is under-controlled with respect to the operation level to a reverse current level at an end segment of the vibration period.

27. A driver alert system according to claim 25, wherein the operation level is essentially constant.

28. A driver alert system according to claim 25, wherein the control circuit is adapted to periodically interrupt the electric supply to the motor in order to alternate a plurality of the vibration periods and a plurality of the non-vibration periods.

29. A driver alert system according to claim 25, wherein the vibration periods have a length in the range of 250 ms to 5 s.

30. A driver alert system according to claim 25, wherein the non-vibration periods have a length in the range of 250 ms to 1 s.

31. A driver alert system according to claim 25, wherein the electric supply provides an operation level is chosen to maintain a rotation frequency of the motor in the range of 30 to 70 Hz within the vibration period.

* * * * *

UNITED STATES PATENT AND TRADEMARK OFFICE
CERTIFICATE OF CORRECTION

| | | |
|---|---|---|
| PATENT NO. | : 7,902,987 B2 | Page 1 of 1 |
| APPLICATION NO. | : 12/137973 | |
| DATED | : March 8, 2011 | |
| INVENTOR(S) | : Lemasson et al. | |

It is certified that error appears in the above-identified patent and that said Letters Patent is hereby corrected as shown below:

<u>In the Claims</u>

In claim 16, column 6, line 24, after "electric", delete "meter" and insert --motor--.

In claim 25, column 7, line 2, delete "aird" and insert --and--.

Signed and Sealed this
Third Day of May, 2011

David J. Kappos
*Director of the United States Patent and Trademark Office*